Patented Feb. 10, 1953

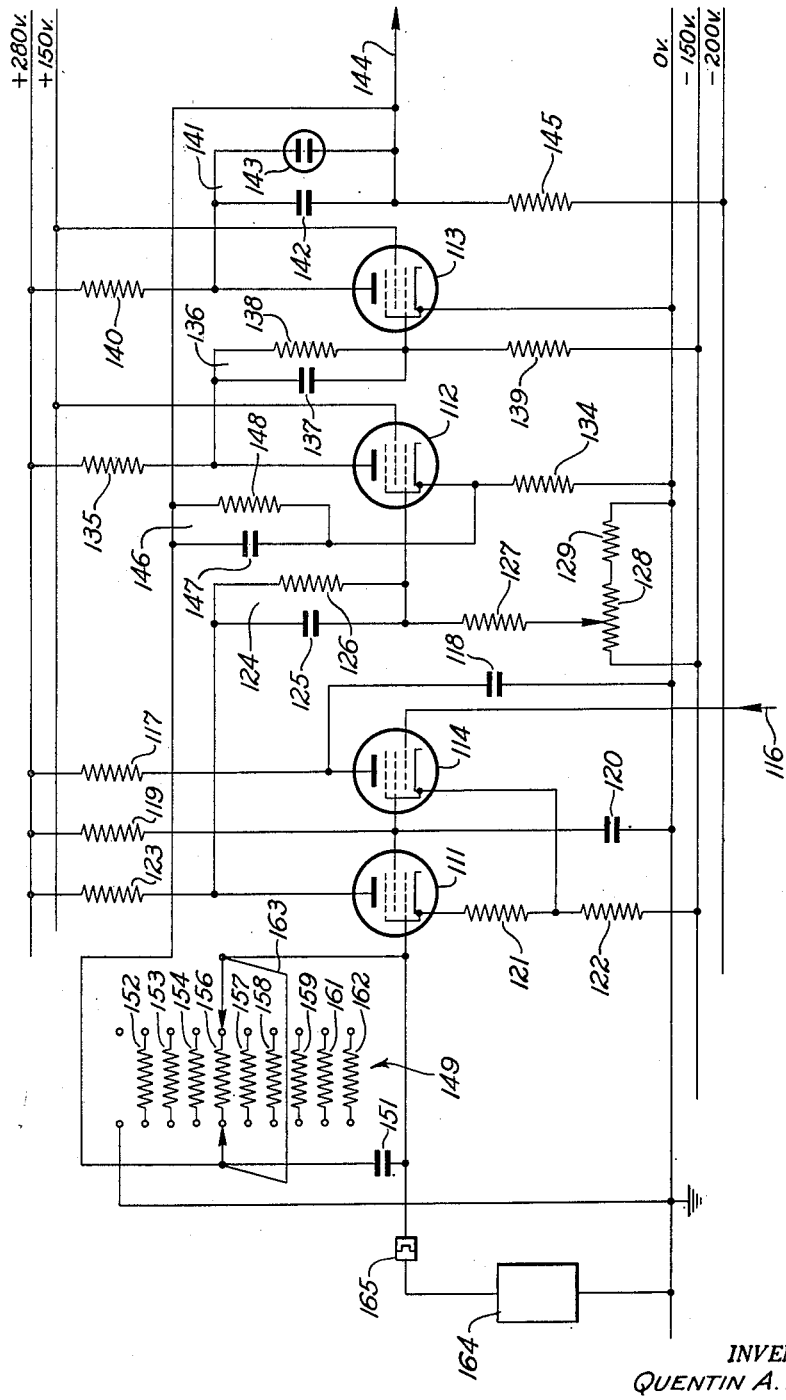

2,628,268

UNITED STATES PATENT OFFICE 2,628,268

AMPLIFIER CIRCUIT FOR TESTING

Quentin A. Kerns, Oakland, Calif., assignor to the United States of America as represented by the United States Atomic Energy Commission Original application June 19, 1947, Serial No. 755,794. Divided and this application October 4, 1949, Serial No. 119,539

3 Claims. (Cl. 175—183)

This invention relates to an amplifier circuit and more particularly to a negative feedback amplifier circuit for use in determining the current-voltage characteristics of electrical devices. This application is a division of the applicant's copending application, Serial No. 755,794, filed June 19, 1947.

In the electrical art it is often desirable to know the current-voltage characteristics of electrical devices such as electrolytic cells, discharge devices and the like. The present invention obviates the necessity of tedious manual work in obtaining current readings at various voltages and then plotting the results on a chart, by providing a circuit for automatically displaying or recording the current-voltage characteristics. The circuit herein disclosed further provides for minimum distortion in the characteristic by utilizing a novel negative feedback amplifier circuit having a novel input circuit.

It is therefore an object of the present invention to provide a new and improved amplifier circuit.

Another object of the invention is to provide a new and improved circuit for automatically determining the current-voltage characteristics of an electrical device.

A further object of the invention is to provide an input circuit for an amplifier having a negative feedback circuit whereby the input is distorted a minimum amount at the output.

Still another object of the invention is to provide a negative feedback amplifier circuit wherein the current-voltage characteristics of an electrical device connected into the negative feedback circuit is automatically determined.

Still further objects and advantages of the invention will be apparent in the following description and claims considered together with the accompanying drawing showing a schematic wiring diagram embodying the invention.

Referring to the drawing in detail there are shown three pentode vacuum tubes 111, 112 and 113, which give three stages of amplification, and a pentode tube 114 which serves to couple the input voltage to the amplifier stages. An input lead 116 is connected to the control grid of the tube 114 and supplies a voltage of sawtooth waveform from a voltage generator (not shown). Other connections of the tube 114 are: from the anode to a +280 volt source of direct current through a dropping resistor 117 and to ground through a by-pass condenser 118; from the screen grid to the +280 volt source of direct current through a dropping resistor 119 and to ground through a by-pass condenser 120; and from the suppressor grid to the cathode, the latter of which is connected to a —150 volt source of direct current through a cathode resistor 122. The cathode of the tube 111 is connected to the suppressor grid and to the cathode of the tube 114 through a resistor 121. A connection is made from the screen grid of the tube 111 to the screen grid of the tube 114. The anode of the tube 111 is connected to the +280 volt direct current source through a dropping resistor 123 and, further, to the control grid of the tube 112 through a low impedance coupling network 124 comprising a parallel connected condenser 125 and resistor 126. For furnishing a variable bias voltage to the control grid of the tube 112, there is provided a resistor 127 connected to the variable portion of a resistance voltage divider comprising a potentiometer 128 and a resistor 129 between the —150 volt direct current source and ground. Other connections provided for the tube 112 are: from the cathode to the suppressor grid and to ground through a resistor 134, from the screen grid directly to a +150 volt direct current source, and from the anode to the +280 volt direct current source through a dropping resistor 135. A further connection is made from the anode of the tube 112 to the control grid of the tube 113 through a low impedance coupling network 136 comprising a condenser 137 and a resistor 138. For furnishing the necessary bias voltage for the control grid of the tube 113, a resistor 139 is connected between the control grid and the —150 volt direct current source. The suppressor grid and cathode of the tube 113 are connected together and in turn connected directly to ground. The screen grid of the tube 113 is supplied with a suitable voltage by a direct connection to the +150 volt direct current source. A suitable anode voltage for the tube 113 is supplied from the +280 volt direct current source through a dropping resistor 140. The anode of this tube 113 serves as the source of output voltage which is removed by a lead 144 through a coupling network 141 comprising a parallel connected condenser 142 and neon bulb 143. The lead 144 is further connected to a —200 volt source of direct current through a resistor 145. A portion of the output voltage at the lead 144 is fed back to the cathode of the tube 112 through a coupling network 146 comprising a parallel connected condenser 147 and resistor 148. Also provided as a feedback circuit is a connection from the lead 144 to the control grid of the tube 111 through a coupling network 149 comprising the condenser 151 and one of a plurality of resistors 152 to 154, 156 to 159, 161 and 162 as selected by a selector switch 163. One terminal of the selector switch is connected directly to ground, for use in short-circuiting the feedback voltage when desired. As a means of connecting a device 164, of which the current-voltage characteristic is desired, across the feedback voltage of the amplifier, there is provided a plug 165.

Now, consider the operation of the present invention with the necessary voltage sources energized and an electrical device 164, the current-voltage characteristic of which is desired, connected between the plug 165 and ground. Under these conditions, the circuit is ready to operate, and a positive-going sawtooth wave of voltage impressed by the lead 116 on the control grid of the tube 114 will impress a similar voltage at the cathode of the tube 111. This action will be apparent in considering the interconnection of the cathodes of the two tubes 114 and 111 which have a common cathode resistor 122. To insure that the input voltage is free from distortion the circuit has been designed to include a common screen grid supply voltage which is by-passed to ground by a condenser 120. Also, the two tubes 111 and 114 are chosen to be of a similar type and a further measure is taken by by-passing variations in the anode voltage of the tube 114 with a condenser 118. Thus, the input circuit is effectively isolated from distortion from the various power sources.

The positive-going sawtooth of voltage thereby raises the cathode voltage of the tube 111, reduces the conduction of the tube and causes a decreasing voltage across the dropping resistor 123 in the anode circuit of the tube. Thus, the voltage at the anode of the tube 111 increases and a positive-going sawtooth voltage, similar to that at the cathode of the tube, is formed.

Since the anode of the tube 111 is connected to the control grid of the tube 112 by the condenser 125 and resistor 126 of network 124, the positive-going sawtooth voltage developed at the anode of the tube 111 is coupled to the control grid of the tube 112 to control the operation thereof. The control grid of the tube 112 is also connected to a variable voltage so that the grid bias voltage is controllable. The tubes 112 and 113 are interconnected in such a manner as to form two stages of amplification of the positive-going sawtooth voltage formed at the control grid of the tube 112.

The output voltage of the tube 113 is taken from the anode and a feedback circuit arranged to couple portions of this output voltage back to the cathode of the tube 112 and to the control grid of the tube 111. The portion of the output voltage impressed at the control grid of the tube 111 is coupled thereto through a resistor, condenser, and switch arrangement 149 in such a manner that the voltage is controllable in a desired incremental manner as is the over-all amplification of the circuit.

From the foregoing, it is seen that a positive-going sawtooth voltage is impressed across the device 164 which is connected between the control grid of the tube 111 and ground and that the voltage applied to the amplifier is therefore proportional to the current flowing through the device. The output voltage at the lead 144 will then be proportional to the sum of the input voltage and the voltage across the device 164.

It is to be noted that the operating voltages in the foregoing discussion, referenced by numerical values, are used only for illustrative purposes and should not be considered as limiting the values of these voltages in any manner.

An illustrative set of values for the different circuit elements of the invention is listed below, but should not be considered as limiting the invention to such values.

| | |
|---|---|
| 111 | Tube, 6SH7 |
| 112 | Tube, 6SH7 |
| 113 | Tube, 6SH7 |
| 114 | Tube, 6SH7 |
| 117 | Resistor, 30,000 ohm, 2 w. |
| 118 | Condenser, .005 mfd., 600 v. |
| 119 | Resistor, 50,000 ohm, 1 w. |
| 120 | Condenser, .005 mfd., 600 v. |
| 121 | Resistor, 5 ohm, ½ w. |
| 122 | Resistor, 12,000 ohm, 2 w. |
| 123 | Resistor, 30,000 ohm, 2 w. |
| 125 | Condenser, 10 mmfd. |
| 126 | Resistor, 3 megohm, ½ w. |
| 127 | Resistor, 2 megohm, ½ w. |
| 128 | Resistor, 0.1 megohm, 1 w. |
| 129 | Resistor, 0.2 megohm, ½ w. |
| 134 | Resistor, 500 ohm, 1 w. |
| 135 | Resistor, 10,000 ohm, ½ w. |
| 137 | Condenser, 10 mmfd. |
| 138 | Resistor, 3 megohm, ½ w. |
| 139 | Resistor, 2 megohm, ½ w. |
| 140 | Resistor, 30,000 ohm, 2 w. |
| 142 | Condenser, .01 mfd., 600 v. |
| 143 | Neon lamp, NE-4. |
| 145 | Resistor, 0.5 megohm, ½ w. |
| 151 | Condenser, 10 mmfd. |
| 152 | Resistor, 40,000 ohm, ½ w. |
| 153 | Resistor, 80,000 ohm, ½ w. |
| 154 | Resistor, 0.2 megohm, ½ w. |
| 156 | Resistor, 0.4 megohm, ½ w. |
| 157 | Resistor, 0.8 megohm, ½ w. |
| 158 | Resistor, 2.0 megohm, ½ w. |
| 159 | Resistor, 4.0 megohm, ½ w. |
| 161 | Resistor, 8.0 megohm, ½ w. |
| 162 | Resistor, 20.0 megohm, ½ w. |

One manner of using the present invention is described and illustrated in the above-referenced copending application, Serial No. 755,794, filed June 19, 1947, by the applicant. In this utilization, the current-voltage characteristics of an electrolyte in a dropping mercury cell is determined.

A further utilization for the present invention is the determination of the current-voltage characteristics of electron discharge devices of the vacuum tube class. In this instance, the anode is connected to the plug 165, the cathode is connected to ground and the control grid is connected to a suitable bias voltage. Thus, a positive-going sawtooth voltage impressed at the control grid of the tube 114, will apply a similar voltage between the anode and cathode of the electron discharge device. At a constant grid bias voltage, the current flowing through the tube will vary according to the positive-going sawtooth voltage applied. Therefore, the voltage which is impressed at the control grid of the tube 111 is proportional to the current flowing through the device and is available at the output lead 144 of the amplifier.

There are many ways of measuring or recording the current-voltage characteristic of the electron discharge device, now that a voltage has been developed which is proportional to the current flowing, and one such way is to impress the output voltage of the amplifier on one set of deflecting plates of an oscilloscope with the sawtooth voltage impressed on the other set of deflecting plates. In this manner the current-voltage characteristics are obtained directly and may be photographed for a permanent record.

While the present invention has been described with respect to one embodiment it will, of course, be apparent that many modifications may be made within the spirit and scope of this invention and it is therefore not desired to limit the invention to the exact details except insofar as they may be defined in the following claims.

What is claimed is:

1. In apparatus for measuring current-voltage characteristics, the combination comprising an amplifier having an input and an output, a first and second vacuum tube, each of said tubes having at least a cathode, a control grid, and an anode, two equal resistances for connecting the anodes of the respective tubes to a positive voltage, a common resistance connecting said cathodes to a negative voltage, the anode of said second tube being connected to the input of said amplifier, a negative feedback circuit for connecting the output of said amplifier to the control grid of said second tube, and a device having characteristics which it is desired to determine connected between the control grid of said second tube and a neutral voltage, whereby a voltage proportional to the current through said device appears at the output of said amplifier each time a linearly varying voltage is applied to the control grid of said first tube.

2. In a measuring apparatus, the combination comprising a first vacuum tube, a source of input voltage connected to the control grid of said first tube, a second vacuum tube, said first and second tubes having a common cathode resistor, a third vacuum tube, the control grid of said third tube being coupled to the anode of said second tube, a fourth vacuum tube, the control grid of said fourth tube being coupled to the anode of said third tube, a variable resistance-capacitance network coupled to the anode of said fourth tube and connected to the control grid of said second tube, an electrical device having unknown characteristics connected to the control grid of said second tube, and power supply means connected to said tubes to bias said first, second, and fourth tubes nonconducting and said third tube conducting whereby a voltage proportional to the current flow through said device is developed at the anode of said fourth tube each time a linearly varying voltage is applied to said input lead.

3. In a measuring apparatus, the combination comprising a first and second vacuum tube, each of said tubes having at least a cathode, a control grid, and an anode, a common resistance connected to the cathode of said tubes, means connected to said tubes for impressing operating voltages thereon, a device having characteristics which it is desired to determine connected to the control grid of the second of said tubes, an amplifier having an input and an output, the anode of the second of said tubes being connected to the input of said amplifier, and adjustable means connected between the output of said amplifier and the control grid of said second tube for impressing a portion of the output of said amplifier across said device whereby a voltage proportional to the current flow through said device appears at the output of said amplifier each time a linearly varying voltage is impressed on the control grid of said first tube.

QUENTIN A. KERNS.

REFERENCES CITED

The following references are of record in the file of this patent:

UNITED STATES PATENTS

| Number | Name | Date |
|---|---|---|
| 2,185,367 | Blumlein | Jan. 2, 1940 |
| 2,190,743 | Vance | Feb. 20, 1940 |
| 2,401,779 | Swartzel | June 11, 1946 |
| 2,431,973 | White | Dec. 2, 1947 |
| 2,470,219 | McNaughton | May 17, 1949 |
| 2,475,188 | Krauth | July 5, 1949 |
| 2,479,909 | Darlington | Aug. 23, 1949 |